United States Patent [19]

Endo et al.

[11] Patent Number: 5,300,751

[45] Date of Patent: Apr. 5, 1994

[54] METHOD FOR GAS-SHIELD ARC WELDING OF A PIPE AND WELD WIRE FOR USE IN THE WELDING METHOD

[75] Inventors: Shigeru Endo; Moriyasu Nagae; Motokiyo Itoh, all of Tokyo; Toshihiko Nakano; Masato Konishi, both of Kanagawa, all of Japan

[73] Assignees: NKK Corporation, Tokyo; Kobe Steel, Ltd., Kobe, both of Japan

[21] Appl. No.: 935,523

[22] Filed: Aug. 25, 1992

[30] Foreign Application Priority Data

Aug. 30, 1991 [JP] Japan .................................. 3-219955
Sep. 2, 1991 [JP] Japan .................................. 3-248249

[51] Int. Cl.$^5$ ................................................ B23K 9/23
[52] U.S. Cl. .............................. 219/61; 219/137 WM
[58] Field of Search ............ 219/61, 137 WM, 146.22, 219/146.23

[56] References Cited

U.S. PATENT DOCUMENTS 4,143,258  3/1979  McCann et al. ............ 219/137 WM
4,426,426  1/1984  Muhlberger ................ 219/137 WM

FOREIGN PATENT DOCUMENTS 0914339  1/1963  United Kingdom .
0935028  8/1963  United Kingdom .
0963205  7/1964  United Kingdom .
1517812  7/1978  United Kingdom .
1527674  10/1978  United Kingdom .
1589371  5/1981  United Kingdom .

OTHER PUBLICATIONS

Iron and Steel–"Journal of the Iron and Steel Institute", (published by the Iron and Steel Institute of Japan), vol. 72, No. 12, Sep. 1986, pp. 1265-1266.
Material–"Journal of the Society of Materials Science, Japan"(published by the Society of Material Science, Japan), vol. 38, No. 424, Jan. 1989, pp. 62-68.

Primary Examiner—Clifford C. Shaw
Attorney, Agent, or Firm—Michael N. Meller

[57] ABSTRACT

Disclosed is a gas-shield arc welding method in which chemical components of base material and weld material (gas-shield arc welding wire), chemical component ranges of weld metal based on the base material and the weld material, especially, difference ($\Delta(Cu+Ni)$, $\Delta Mo$) of Cu, Ni and Mo between the weld metal and the base material, and welding conditions are limited for the purpose of improvement preferential corrosion resistance, toughness and crack resistance of the weld metal in circumferential welding of a pipe exposed into a corrosion environment including $CO_2$.

4 Claims, 1 Drawing Sheet

F I G. 1

F I G. 2

METHOD FOR GAS-SHIELD ARC WELDING OF A PIPE AND WELD WIRE FOR USE IN THE WELDING METHOD

BACKGROUND OF THE INVENTION (a) Field of the Invention

The present invention relates to a method for circumferential welding of a line pipe for transporting $CO_2$-containing petroleum or natural gas or transporting $CO_2$ and, more particularly, it relates to a circumferential welding method excellent in preferential corrosion resistance, low-temperature toughness and crack resistance of weld metal and also relates to weld wire for suitably carrying out the welding method.

(b) Description of the Prior Art

There are published literatures concerning preferential corrosion on a weld portion of low alloy steel, as follows.

(1) Statement that the difference between the Ni content of base material and the Ni content of weld metal gives an influence on the local corrosion of a weld joint portion in a frozen sea region (by Takashi Abe et al.; "Iron and Steel", Vol. 72, No. 12, s1266, 1986).

(2) Statement that Ni and Cu represented by
$3.8\Delta Cu + 1.1\Delta Ni + 0.3$
give an influence on preferential corrosion characteristic in the case of the local corrosion of a weld portion of steel in a frozen sea region (by Kitaro Ito et al.; "Iron and Steel", Vol. 72, No. 12, s1265, 1986).

(3) Statement that use of a low alloy weld rod containing Cu and Ni is effective on the prevention of the preferential corrosion of a circumferential weld portion of a carbon steel pipe (by Hideaki Ko; "Material" Vol. 38, No. 424, p62–p68, 1989).

(4) Statement that addition of Ni and Mo is effective on the prevention of the preferential corrosion of a vertical seam weld portion of a welded pipe (by Suga et al.; Japanese Patent Laid-open No. 3-170641).

As described above, there have been found a method of adding Ni and Cu to improve the preferential corrosion of weld metal in a corrosion environment of seawater containing oxygen such as a frozen sea and a method of adding Ni and Mo to improve the preferential corrosion characteristic of a vertical seam portion of a welded steel pipes. There is not yet any knowledge that addition of Ni and Mo is effective for the prevention of the preferential corrosion of a circumferential weld portion of a line pipe used in a corrosion environment containing $CO_2$. There is not yet any gas-shield arc welding method based on the consideration of the hardness of the weld metal, the crack resistance thereof and the like. Further, there is not yet any method for solving the problem specifically in the relation between the weld metal and the base material.

When a welded steel pipe or a seamless steel pipe is used for transporting $CO_2$-containing petroleum or natural gas or transporting $CO_2$, so-called preferential corrosion of a weld portion in which circumferential weld metal is corroded preferentially may occur. This is a phenomenon that the difference in chemical components and structure between the weld metal and the base material makes the weld metal portion electrochemically poor to thereby preferentially corrode the weld metal portion.

In the case of a line pipe used in the aforementioned environment, any circumferential welding method based on the consideration of the preferential corrosion has been not discussed. In a real environment, this kind preferential corrosion is often put in a problem awaiting solution so that the discussion thereof is expected today.

SUMMARY OF THE INVENTION

Therefore, the inventors of the present application have made a thorough examination into preferential corrosion characteristic, mechanical strength, crack resistance and the like, of a weld portion in a corrosion environment including $CO_2$ and seawater while variously changing chemical components of circumferential weld metal and the amounts thereof.

The present invention is based on the knowledge obtained as a result of the examination and has as its object the provision of a method for gas-shield arc welding of a pipe which comprises adjusting base material, weld material and welding means to adjust chemical components of a weld metal portion to thereby not only prevent the preferential corrosion of the circumferential weld metal portion but obtain circumferential weld metal having sufficient strength, sufficient toughness and sufficient crack resistance, and the provision of weld wire used in the welding method.

According to a first aspect of the present invention, the foregoing object is attained by a method for gas-shield arc welding of a pipe in which weld metal base has the following chemical components (% by weight):

C; 0.01 to 0.15%
Si; 0.20 to 1.00%
Mn; 0.40 to 2.00%
Cu; $\leq 2.50\%$
Ni; 0.50 to 2.50%
$\Delta Cu + Ni$; $\geq 0.50\%$
($\Delta$; content in weld metal—content in base material)
$P_{CM}$; $\leq 0.25\%$
in which $$P_{CM} = C + Si/30 + Mn/20 + Cu/20 + Ni/60 + Cr/20 + Mo/15 + V/10 + 5B \qquad (1)$$

and the residual part is composed of Fe and inevitable impurities satisfying the following ranges:

| P; $\leq 0.030\%$ | S; $\leq 0.030\%$ | Al; $\leq 0.05\%$ |
| N; $\leq 0.050\%$ | Nb; $\leq 0.10\%$ | V; $\leq 0.10\%$ |
| Cr; $\leq 1.00\%$ | Ca; $\leq 0.0025\%$ | O; $\leq 0.10\%$ |
| Zr; $\leq 0.05\%$ | B; $\leq 0.002\%$ | |

According to a second aspect of the invention, the foregoing object is attained by a method for gas-shield arc welding of a pipe in which weld metal has chemical components (% by weight) as defined above and further contains either Mo or Ti or both Mo and Ti in the following proportion:

Mo; $\leq 1.05\%$ or $\Delta Mo$; $\geq 0.03\%$
($\Delta$: content in weld metal—content in base material)
Ti; $\leq 0.25\%$ Further, ① the chemical components of the pipe base material, ② the chemical components of the weld wire, and ③ the welding conditions used for the first and second aspects of the present invention are set as follows:

① The chemical components of the pipe base material contain (% by weight):

C; 0.03 to 0.15%
Si; 0.05 to 0.50%
Mn; 0.50 to 2.00%

Al; 0.005 to 0.10%
or contain, in addition to the above-mentioned chemical components, at least one member selected from the following group:
Cu; 0.05 to 2.0%
Ni; 0.05 to 2.0%
Cr; 0.05 to 2.0%
Mo; 0.05 to 1.0%
Nb; 0.005 to 0.20%
V; 0.005 to 0.20%
Ti; 0.005 to 0.20%
B; 0.0005 to 0.0020%
Ca; 0.0005 to 0.0050;
and further contain, as the residual part, Fe and inevitable impurities.

(2) the chemical components of the weld wire contain (% by weight);
C; 0.01 to 0.15%
Si; 0.20 to 1.20%
Mn; 0.60 to 2.50%
Cu; $\leq 3.00\%$
Ni; 0.50 to 3.00%
or contain, in addition to the above-mentioned chemical components, at least one member selected from the following group:
Mo; $\leq 1.10\%$
Ti; $\leq 0.30\%$
and further containing, as the residual part, Fe and inevitable impurities satisfying the following ranges:

| P; $\leq 0.030\%$ | S; $\leq 0.030\%$ | Al; $\leq 0.05\%$ |
| --- | --- | --- |
| N; $\leq 0.01\%$ | Nb; $\leq 0.02\%$ | V; $\leq 0.02\%$ |
| Cr; $\leq 0.05\%$ | Zr; $\leq 0.05\%$ | O; $\leq 0.02\%$ |
| B; $\leq 0.002\%$. | | |

(3) The welding conditions are:
shield gas; 100% $CO_2$ or Ar+(from 5 to 40% of) $CO_2$
wire diameter; 0.8 to 1.6 mm
welding current; 100 to 500 A
arc voltage; 15 to 45 V
welding speed; 5 to 150 cm/min
welding attitude; all position.

The gas-shield arc welding wire used in the welding method according to the present invention contains (% by weight):
C; 0.01 to 0.15%
Si; 0.20 to 1.20%
Mn; 0.60 to 2.50%
Cu; $\leq 3.00\%$
Ni; 0.50 to 3.00%
and further contains, as the residual part, Fe and inevitable impurities limited as follows: P$\leq 0.030\%$, S$\leq 0.030\%$, Al$\leq 0.05\%$, N$\leq 0.01\%$, Nb$\leq 0.02$ %, V$\leq 0.02\%$, Cr$\leq 0.05\%$, Zr$\leq 0.05\%$, O$\leq 0.02\%$ and B$\leq 0.002\%$.

The gas-shield arc welding wire may contain, in addition to the above-mentioned chemical components, at least one member selected from the group consisting of Mo$\leq 1.10\%$ and Ti$\leq 0.30\%$.

In the present invention, as described above, the chemical components of the weld metal are limited by limiting the ranges of the chemical components of the base material and the welding wire and the welding conditions, so that circumferential welding excellent in preferential corrosion resistance, strength, toughness and crack resistance can be provided.

The chemical components of the weld metal are respectively limited for the following reasons.
C; 0.01 to 0.15%

The C content of the weld metal is limited to a range of from 0.01 to 0.15% in order to obtain good workability and good mechanical properties of the weld metal. If the C content is smaller than 0.01%, the size of ferrite particles in the weld metal is increased so roughly that both strength and toughness are lowered to make mechanical properties insufficient to the base material. If the C content is larger than 0.15%, the strength of the weld metal is so excessively larger than that of the base material that lowering of toughness occurs. Furthermore, the hardness is increased so greatly that welding crack and stress corrosion crack sensitivity is increased.
Si; 0.20 to 1.00%

The Si content of the weld metal is limited to a range of from 0.20 to 1.00% in order to obtain good workability and good mechanical properties of the weld metal. If the Si content is smaller than 0.20%, the fitting of the weld metal to the base material is lowered to make the bead form so poor that defects such as a failure in melting may be caused. Particularly in the case where the Si content is extremely small, "blowhole" is caused by shortage of deoxidation. Furthermore, with respect to mechanical properties, the strength of the weld metal is extremely smaller than that of the base material. If the Si content of the weld metal is larger than 1.00%, the strength of the weld metal is so excessively larger than that of the base material that shortage of toughness is caused. Furthermore, the hardness is increased so greatly that welding crack and stress corrosion crack sensitivity is increased.
Mn; 0.40 to 2.00%

The Mn content of the weld metal is limited to a range of from 0.40 to 2.00% in order to obtain good workability and good mechanical properties. If the Mn content is smaller than 0.40%, the slag amount increases as the value of Mn/Si approaches 1 or as the value decreases smaller than 1. The increase of the slag amount causes slag involvement and the like. Particularly in the case where the Mn content is extremely small, "blowhole" is caused by shortage of deoxidation. Furthermore, with respect to mechanical properties, the strength of the weld metal is extremely smaller than that of the base material or the quench hardening characteristic thereof is lowered so that the toughness thereof is deteriorated. If the Mn content of the weld metal is larger than 2.00%, the strength of the weld metal is so excessively larger than that of the base material that shortage of toughness is caused. Furthermore, the hardness is increased so greatly that welding crack and stress corrosion crack sensitivity is increased.
Cu; $\leq 2.50\%$
Ni; 0.50 to 2.50%

To improve the toughness of the weld metal and the preferential corrosion characteristic thereof (see FIG. 1), Cu and Ni are added to the weld metal in the amount (Cu) of not larger than 2.50% and the amount (Ni) of from 0.50 to 2.50%. Cu has an effect of improving the preferential corrosion characteristic of the weld metal. If the Cu content is larger than 2.50%, sensitivity to high-temperature cracking is increased. Also, Ni has an effect on improvement of the preferential corrosion characteristic. In the case where there is no addition of Cu, the Ni content of not smaller than 0.50% is required in order to obtain good preferential corrosion characteristic. If the Ni content is larger than 2.50%, the strength of the weld metal is so excessively larger than that of the base material that shortage of toughness is caused. Furthermore, the hardness is increased so greatly that welding crack and stress corrosion crack sensitivity is increased.

Particularly to prevent the occurrence of stress corrosion cracking, the Ni content is limited to a smaller value than 1.00%. Either plating or melting may be used as a method for adding Cu and Ni to the wire. To obtain better preferential corrosion characteristic, it is preferable that the difference $\Delta(Cu+Ni)$ between the Cu/Ni content of the weld metal and the Cu/Ni content of the base material is not smaller than 0.5% as shown in FIG. 1.

Figure 1:
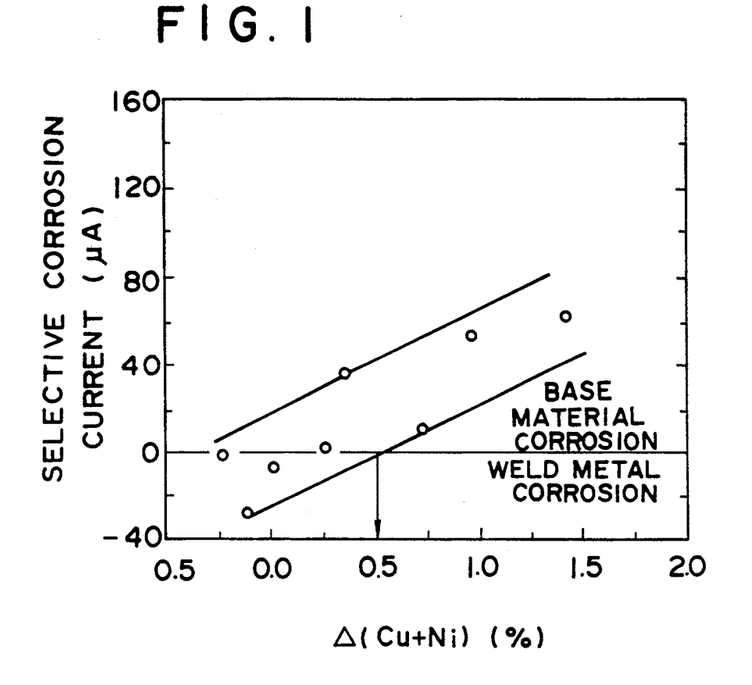
FIG. 1 is a graph showing the relation between preferential corrosion current ($\mu A$) flowing in between a base material and a weld metal and $\Delta(Cu+Ni)$.

FIG. 1 is a graph showing the influence of $\Delta(Cu+Ni)$ on preferential corrosion characteristic. In the graph, the ordinate represents preferential corrosion current ($\mu A$) flowing in between the base material and the weld metal, and the abscissa represents $\Delta(Cu+Ni)$ (%). When the preferential corrosion current takes a plus value, there is no preferential corrosion of the weld metal. When $\Delta(Cu+Ni)$ is not smaller than 0.5%, the preferential corrosion current takes a plus value.

$P_{CM}$; $\leq 0.25\%$

If the value of $P_{CM}$ expressed by the formula (1) is larger than 0.25%, the strength of the weld metal is so excessively larger than that of the base material that shortage of toughness is caused. Furthermore, the hardness is increased so greatly that welding crack and stress corrosion crack sensitivity is increased.

In the second aspect of the invention, not only the aforementioned components but selected components as described above and the amounts thereof are limited.

Mo; $\leq 1.05\%$
$\Delta Mo$; $\leq 0.03\%$

Figure 2:
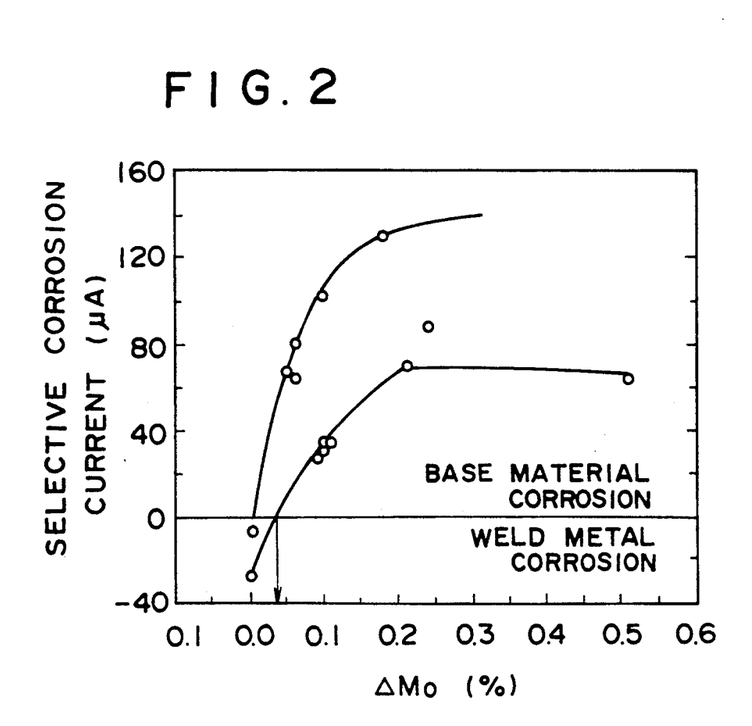
FIG. 2 is a graph showing the relation between preferential corrosion current ($\mu A$) flowing in between the base material and the weld metal and $\Delta Mo$.

To prevent the preferential corrosion of the weld metal, Mo is added to the weld metal by the amount not more than 1.05% so that $\Delta Mo$ is not smaller than 0.03%. When the difference $\Delta Mo$ between the Mo content of the weld metal and the Mo content of the base material is not smaller than 0.03% as shown in FIG. 2, the preferential corrosion of the weld metal in a corrosion environment including $CO_2$ can be prevented. If the Mo content is larger than 1.05%, the hardness of the weld metal is increased so greatly that sensitivity to welding low-temperature cracking and stress corrosion cracking is increased.

FIG. 2 is a graph showing the influence of $\Delta Mo$ on preferential corrosion characteristic. In the graph, the ordinate represents preferential corrosion current ($\mu A$) flowing in between the base material and the weld metal, and the abscissa represents $\Delta Mo$ (%). When the preferential corrosion current takes a plus value, there is no preferential corrosion of the weld metal. When $\Delta Mo$ is not smaller than 0.03%, the preferential corrosion current takes a plus value.

Ti; $\leq 0.25\%$

If necessary, Ti may be added to the weld metal in a range of not larger than 0.25% in order to make initially precipitated ferrite fine to improve the toughness of the weld metal. If the Ti content is larger than 0.25%, the slag amount increases so that the increase of the slag amount causes defects such as slag involvement and the like. Furthermore, the strength of the weld metal is so excessively larger than that of the base material that shortage of toughness is caused. Furthermore, the hardness is increased so greatly that welding crack and stress corrosion crack sensitivity is increased.

Inevitable impurities; When the amounts of inevitable impurities are respectively in the aforementioned ranges, there is no deterioration of preferential corrosion characteristic and mechanical properties of the weld metal. If the amounts of inevitable impurities are respectively larger than the aforementioned ranges, defects such as lowering of welding workability (Al, Zr, Ca), occurrence of a failure in welding (P, S, B, N), deterioration of mechanical properties (Al, Cr, Nb, V, O, N) and the like arise.

The chemical components of the steel pipe base material are limited for the following reasons.

C; 0.03 to 0.15%

Carbon in steel is an element effective for increase of the strength of steel. Excessive addition of carbon, however, causes deterioration of toughness. Accordingly, the upper limit of the carbon content is set to 0.15% in order to produce a steel pipe excellent both in strength and in toughness. Reduction of the carbon content improves toughness but if the carbon content is not larger than 0.03%, toughness is deteriorated. At least 0.03% carbon is necessary for effectively using stable precipitation hardening of Nb, V, Ti and the like. Accordingly, the lower limit of the carbon content is set to 0.03%.

The other components are limited for the following reasons.

Si; 0.05 to 0.50%

Si is necessary for deoxidation but if an excessive amount of Si is added, toughness is deteriorated. Accordingly, the lower and upper limits of the Si content is set to 0.05% and 0.50% respectively.

Mn; 0.50 to 2.00%

At least 0.50% Mn is necessary for deoxidation but if the Mn content is larger than 2.00%, welding characteristic is deteriorated. Accordingly, the upper limit of the Mn content is set to 2.00%.

Al; 0.005 to 0.10%

Al is necessary for deoxidation but the Al content is smaller than 0.005%, deoxidation is insufficient. Accordingly, the lower limit of the Al content is set to 0.005%. On the contrary, if the Al content is larger than 0.10%, both the cleaning degree of steel and the HAZ toughness thereof are deteriorated. Accordingly, the upper limit of the Al content is set to 0.10%.

Cu; 0.05 to 2.0%
Ni; 0.05 to 2.0%

Cu and Ni improve the strength and toughness of the base material without any bad influence on HAZ toughness. If the Cu content or Ni content is larger than 2.0%, Cu or Ni has a bad influence on the hardening characteristic and toughness of HAZ. Accordingly, the upper limit of the Cu content or Ni content is set to 2.0%.

Cr; 0.05 to 2.0%

Cr has an effect of improving the strength of the base material and the weld portion but if the Cr content is larger than 2.0%, both hardening characteristic and toughness of HAZ are deteriorated. Accordingly, the upper limit of the Cr content is set to 2.0%.

Mo; 0.05 to 1.0%

Mo has an effect of improving strength and toughness of the base material but if the Mo content is larger than 1.0%, the quench hardening characteristic of HAZ is increased so that welding characteristic is deteriorated. Accordingly, the upper limit of the Mo content is set to 1.0%.

The lower limit in each of the amounts of these elements added to the base material is set to 0.05% as the minimum amount required for attaining the effect of the material.

Nb; 0.005 to 0.20%
V; 0.005 to 0.20%

Nb and V exhibit an effect on strength and toughness but if the Nb or V content is larger than 0.20%, the toughness of the base material and the weld portion is deteriorated. Accordingly, the upper limit of the Nb or V content is set to 0.20%. The lower limit of the Nb or V content is set to 0.005% as the minimum amount required for improvement of quality of the material.

Ti; 0.005 to 0.20%

When the Ti content is not smaller than 0.005%, Ti has an effect of preventing the roughly increase of the size of austenite at the time of the heating of the slag. Accordingly, the lower limit of the Ti content is set to 0.005%. If an excessive amount of Ti is added, the toughness of the weld portion is deteriorated. Accordingly, the upper limit of the Ti content is set to 0.20%.

B; 0.0005 to 0.0020%

B is effective for increase of the strength of the base material but addition of the excessive amount of B causes deterioration of welding characteristic and HAZ toughness. Accordingly, the upper limit of the B content is set to 0.0020%. The lower limit is set to 0.0005% as the minimum amount exhibiting an effect on increase of strength.

Ca; 0.0005 to 0.0050%

Addition of Ca has an effect on improvement of hydrogen-induced crack resistance and the lower limit of the Ca content is set to 0.0005% as the minimum amount exhibiting the effect. Excessive addition of Ca is harmful because oxide is formed. Accordingly, the upper limit of the Ca content is set to 0.0050%.

Chemical components (% by weight) of the welding wire in the present invention are limited for the following reasons.

C; 0.01 to 0.15%

C is added to the wire in order to obtain good welding workability and good mechanical properties of the weld metal. If the C content is smaller than 0.01%, droplet transfer becomes so unstable that the quantity of sputter is increased. Furthermore, the particle size of ferrite in the weld metal is increased so roughly that both strength and toughness are deteriorated to make mechanical properties insufficient to the base material. On the contrary, if the C content is larger than 0.15%, the quantity of sputter is increased by explosion of $CO_2$ gas generated in the droplet. Furthermore, the strength of the weld metal is so excessively larger than that of the base material that shortage of toughness is caused. Furthermore, the hardness is increased so greatly that welding crack and stress corrosion crack sensitivity is increased. Accordingly, the C content is limited to a range of from 0.01 to 0.15%, preferably, from 0.03 to 0.08%.

Si; 0.20 to 1.20%

Si is added to the wire in order to obtain good welding workability and good mechanical properties of the weld metal. If the Si content is smaller than 0.20%, the fitting of the weld metal to the base material is lowered to make the bead form so poor that defects such as a failure in melting may be caused. Particularly in the case where the Si content is extremely small, "blowhole" is caused by shortage of deoxidation. Furthermore, with respect to mechanical properties, the strength of the weld metal is extremely smaller than that of the base material. If the Si content of the weld metal is larger than 1.20%, the strength of the weld metal is so excessively larger than that of the base material that shortage of toughness is caused. Furthermore, the hardness is increased so greatly that welding crack and stress corrosion crack sensitivity is increased. Accordingly, the Si content is limited to a range of from 0.20 to 1.20%, preferably, from 0.30 to 0.70%.

Mn; 0.60 to 2.50%

Mn is added to the wire in order to obtain good welding workability and good mechanical properties of the weld metal. If the Mn content is smaller than 0.60%, the slag amount (area) increases as the value of Mn/Si approaches 1 or as the value decreases smaller than 1. The increase of the slag amount causes slag involvement and the like. Particularly in the case where the Mn content is extremely small, "blowhole" is caused by shortage of deoxidation. Furthermore, with respect to mechanical properties, the strength of the weld metal is extremely smaller than that of the base material or the quench hardening characteristic thereof is lowered so that the toughness thereof is deteriorated. On the contrary, if the Mn content of the welding wire is larger than 2.50%, the strength of the weld metal is so excessively larger than that of the base material that shortage of toughness is caused. Furthermore, the hardness is increased so greatly that welding crack and stress corrosion crack sensitivity is increased. Accordingly, the Mn content is limited to a range of from 0.60 to 2.50%, preferably, from 1.30 to 1.80%.

Cu; $\leq$ 3.00%
Ni; 0.50 to 3.00%.

To improve the toughness of the weld metal and the preferential corrosion characteristic thereof, Cu and Ni are added to the welding wire. Cu has an effect of improving the preferential corrosion characteristic of the weld metal but if the Cu content is larger than 3.00%, sensitivity to high-temperature cracking is increased. Also, Ni has an effect on improvement of the preferential corrosion characteristic. In the case where there is no addition of Cu, the Ni content of not smaller than 0.50% is required in order to obtain good preferential corrosion characteristic. If the Ni content is larger than 2.50%, the strength of the weld metal is so excessively larger than that of the base material that shortage of toughness is caused. Furthermore, the hardness is increased so greatly that welding crack and stress corrosion crack sensitivity is increased. Accordingly, the Cu content is limited to a range of not larger than 3.00% and the Ni content is limited to a range of from 0.50 to 3.00%. Either plating or melting may be used as a method for adding Cu and Ni to the wire.

Mo; $\leq$ 1.10%

To prevent the preferential corrosion of the weld metal, Mo may be added to the wire if necessary. If the Mo content is larger than 1.10%, the hardness of the weld metal is increased so greatly that sensitivity to welding low-temperature cracking and stress corrosion cracking is increased. Accordingly, the Mo content is limited to a range of not larger than 1.10%.

Ti; $\leq$ 0.30%

If necessary, Ti may be added to the wire in order to make initially precipitated ferrite fine to improve the toughness of the weld metal. If the Ti content is larger than 0.30%, the slag amount increases so that the increase of the slag amount causes defects such as slag involvement and the like. Furthermore, the strength of the weld metal is so excessively larger than that of the base material that shortage of toughness is caused. Furthermore, the hardness is increased so greatly that welding crack and stress corrosion crack sensitivity is increased. Accordingly, the Ti content is limited to a range of not larger than 0.30%.

Inevitable impurities: It is preferable that the amounts of inevitable impurities are respectively as small as possible. Particularly, when inevitable impurities satisfy the ranges: $P \leq 0.030\%$; $S \leq 0.030\%$; $Al \leq 0.05\%$; $N \leq 0.01\%$; $Nb \leq 0.02\%$; $V \leq 0.02\%$; $Cr \leq 0.05\%$; $Zr \leq 0.05\%$; $O \leq 0.02\%$; and $B \leq 0.002\%$, there is no deterioration of preferential corrosion resistance and mechanical properties of the weld metal. If the amounts of inevitable impurities are respectively larger than the aforementioned ranges, defects such as lowering of welding workability (Al, Zr), occurrence of a failure in welding (P, S, B, N), deterioration of mechanical properties (Al, Cr, Nb, V, O, N) and the like arise.

The welding conditions in the invention are limited for the following reasons.

Shield gas: The composition of shield gas availably used for $CO_2$ welding or MAG (metal active gas) welding is employed.

Wire diameter: The diameter of a welding wire availably used correspondingly to the open-top form and the welding attitude is employed.

Welding current, arc voltage, welding speed: The welding current, the arc voltage and the welding speed generally used in accordance with the open-top form, the welding attitude and the wire diameter are employed.

Welding attitude: All position

"All position" is employed under the consideration of circumferential welding of the pipe.

As described above, according to the present invention, chemical components of a weld metal portion are adjusted on the basis of base material, weld material and welding means. Accordingly, a circumferential weld metal portion having sufficient strength and toughness and being excellent in welding crack resistance and preferential corrosion resistance can be provided by specifying difference of Cu, Ni and Mo between the weld metal portion and the base material in the same manner as described above in the case of preferential corrosion of the circumferential weld portion exposed into a $CO_2$-including seawater environment.

DESCRIPTION OF THE PREFERRED EMBODIMENTS

Examples of the present invention will be described hereunder.

EXAMPLE 1

The chemical components (% by weight) of sample base materials are shown in Table 1. After weld steel pipes each having an outer diameter of 38 inches and a total length of 12 m were produced by using various kinds of steel A to D shown in Table 1, the pipes were circumferentially welded by gas-shield arc welding by using a wire shown in Table 2. The pipes thus welded were subjected to measurement of "strength", "toughness" and "preferential corrosion speed in seawater environment ($CO_2$ bubbling)" of weld metal.

Table 3 shows the chemical components of the weld metal and welding conditions. Table 4 shows "Preferential corrosion speed", "strength", "toughness" and "presence (or absence) of cracking" of weld metal. "Yield strength" and "toughness" were judged by absorption energy at 0° C. respectively with use of No. 3 (6 mm $\phi$) test piece according to JIS Z2201 and No. 4 test piece according to JIS Z3128. "Presence (or absence) of cracking" was judged by observation of five sections after welding. "Preferential corrosion speed" was evaluated by obtaining the difference between the thickness of the base material and the thickness of the weld metal portion after putting artificial seawater in the inside of a 50 cm-long steel pipe including a circumferential weld portion and then blowing $CO_2$ gas therein.

As shown in Tables 3 and 4, it was confirmed that the circumferential weld portion in which chemical components of the weld metal satisfy the ranges defined in claims has a yield strength of not smaller than 350 N/mm² and a toughness of not smaller than 50 J and is excellent in preferential corrosion characteristic ("preferential corrosion speed" is expressed as "0.0" in Table 4 when the weld metal portion is not corroded preferentially), lower in hardness (not smaller than Hv300) and excellent in crack resistance.

TABLE 1

| Steel | C | Si | Mn | Cu | Ni | Cr | Mo | Nb | V | Ti | Al | B | Ca |
|---|---|---|---|---|---|---|---|---|---|---|---|---|---|
| A | 0.05 | 0.29 | 1.50 | 0.22 | 0.25 | — | — | 0.020 | 0.020 | 0.010 | 0.050 | — | 0.0020 |
| B | 0.04 | 0.25 | 1.20 | — | — | 0.20 | — | 0.050 | 0.066 | 0.012 | 0.036 | — | — |
| C | 0.03 | 0.33 | 1.60 | 0.30 | 0.12 | — | — | 0.043 | 0.033 | 0.020 | 0.045 | 0.0008 | — |
| D | 0.06 | 0.35 | 1.80 | 0.21 | 0.41 | — | 0.18 | 0.033 | 0.075 | 0.009 | 0.050 | — | — |

Chemical Components of Given Base Material

TABLE 2

| Symbol | C | Si | Mn | Cu | Ni | Mo | Ti | Fe |
|---|---|---|---|---|---|---|---|---|
| E1 | 0.09 | 0.32 | 1.31 | 0.68 | 1.22 | — | 0.09 | rest |
| E2 | 0.10 | 0.31 | 1.25 | 0.32 | 1.30 | 0.13 | 0.10 | rest |
| E3 | 0.12 | 0.40 | 1.33 | 0.28 | 0.67 | — | — | rest |
| E4 | 0.24 | 0.52 | 1.40 | 0.07 | — | — | — | rest |
| E5 | 0.08 | 0.62 | 1.50 | 0.47 | 1.03 | — | — | rest |
| E6 | 0.14 | 0.65 | 1.60 | — | — | — | — | rest |
| E7 | 0.15 | 0.55 | 1.31 | — | 1.48 | 0.11 | 0.10 | rest |
| E8 | 0.08 | 0.35 | 0.65 | 0.30 | 1.70 | 0.41 | — | rest |
| E9 | 0.08 | 0.75 | 1.50 | 0.39 | 0.62 | — | — | rest |
| E10 | 0.03 | 0.60 | 1.38 | 1.03 | 1.42 | 0.85 | — | rest |
| E11 | 0.11 | 0.27 | 1.05 | 0.35 | 1.74 | — | — | rest |

Chemical Components (% by weight) of Wire

TABLE 3

Chemical Components of Weld Metal and Weld Conditions

Weld metal chemical components (% by weight)

| No. | Steel | Wire | C | Si | Mn | Cu | Ni | $\Delta$(Cu + Ni) | Mo | $\Delta$Mo | Ti | $P_{CM}$ |
|---|---|---|---|---|---|---|---|---|---|---|---|---|
| 1 | A | E1 | 0.06 | 0.25 | 1.25 | 0.45 | 0.75 | 0.73 | — | 0 | 0.03 | 0.17 |
| 2 | A | E2 | 0.06 | 0.25 | 1.22 | 0.27 | 0.78 | 0.58 | 0.06 | 0.06 | 0.03 | 0.16 |
| 3 | A | E3 | 0.09 | 0.30 | 1.20 | 0.25 | 0.40 | 0.18 | — | 0 | — | 0.18 |
| 4 | A | E4 | 0.18 | 0.40 | 1.25 | 0.12 | 0.11 | −0.24 | — | 0 | — | 0.26 |
| 5 | B | E5 | 0.06 | 0.35 | 1.30 | 0.22 | 0.50 | 0.77 | — | 0 | — | 0.16 |
| 6 | B | E6 | 0.10 | 0.40 | 1.25 | — | — | — | — | 0 | — | 0.18 |
| 7 | C | E7 | 0.14 | 0.35 | 1.30 | 0.18 | 0.85 | 0.61 | 0.05 | 0.05 | 0.03 | 0.24 |
| 8 | D | E8 | 0.06 | 0.25 | 1.15 | 0.25 | 1.05 | 0.68 | 0.30 | 0.12 | — | 0.18 |
| 9 | C | E9 | 0.05 | 0.51 | 1.33 | 0.35 | 0.42 | 0.35 | — | 0 | — | 0.15 |
| 10 | B | E10 | 0.04 | 0.39 | 1.22 | 0.62 | 0.85 | 1.47 | 0.51 | 0.51 | — | 0.19 |
| 11 | C | E11 | 0.06 | 0.26 | 1.13 | 0.33 | 1.11 | 1.02 | — | 0 | — | 0.16 |

Weld conditions

| No. | Steel | Wire | Shield gas | Wire Size $\phi$mm | Weld Current A | Arc Volt. V | Weld Speed cm/min |
|---|---|---|---|---|---|---|---|
| 1 | A | E1 | 100% $CO_2$ | 1.2 | 160–180 | 20–30 | 5–40 |
| 2 | A | E2 | 80% Ar + 20% $CO_2$ | 0.9 | 180–250 | 20–30 | 30–130 |
| 3 | A | E3 | 80% Ar + 20% $CO_2$ | 0.9 | 180–250 | 20–30 | 35–130 |
| 4 | A | E4 | 100% $CO_2$ | 1.2, 1.6 | 150–450 | 17–40 | 5–33 |
| 5 | B | E5 | 80% Ar + 20% $CO_2$ | 0.9 | 170–250 | 19–29 | 25–140 |
| 6 | B | E6 | 100% $CO_2$ | 0.8, 1.2 | 100–340 | 16–36 | 7–45 |
| 7 | C | E7 | 90% Ar + 10% $CO_2$ | 1.2 | 150–250 | 18–26 | 8–25 |
| 8 | D | E8 | 70% Ar + 30% $CO_2$ | 1.2, 1.6 | 140–470 | 17–42 | 6–42 |
| 9 | C | E9 | 80% Ar + 20% $CO_2$ | 1.2 | 180–250 | 20–30 | 35–140 |
| 10 | B | E10 | 65% Ar + 35% $CO_2$ | 1.2 | 140–230 | 17–25 | 5–35 |
| 11 | C | E11 | 100% $CO_2$ | 0.8, 1.0 | 100–180 | 16–22 | 40–120 |

TABLE 4

Preferential Corrosion Speed, Strength, Toughness, Presence of Crack Generation of Weld Metal

| No. | Preferential Corrosion Speed (mm/y) | Yield Strength (N/mm$^2$) | Absorption Energy (J) | Weld Metal Hardness (Hv 10 kgf) | Coagulation Crack | Low-Temp. Crack | Estimation | Note |
|---|---|---|---|---|---|---|---|---|
| 1 | 0 | 528 | 121 | 260 | ○ | ○ | ○ | Invention |
| 2 | 0 | 545 | 88 | 245 | ○ | ○ | ○ | Invention |
| 3 | 0.35 | 567 | 75 | 270 | ○ | ○ | X | Comparative |
| 4 | 0.77 | 640 | 30 | 320 | X | X | X | Comparative |
| 5 | 0 | 508 | 98 | 255 | ○ | ○ | ○ | Invention |
| 6 | 0.65 | 478 | 48 | 270 | ○ | ○ | X | Comparative |
| 7 | 0 | 568 | 135 | 300 | ○ | ○ | ○ | Invention |
| 8 | 0 | 548 | 105 | 265 | ○ | ○ | ○ | Invention |
| 9 | 0.42 | 534 | 77 | 243 | ○ | ○ | X | Comparative |
| 10 | 0 | 579 | 94 | 268 | ○ | ○ | ○ | Invention |
| 11 | 0 | 527 | 101 | 251 | ○ | ○ | ○ | Invention |

EXAMPLE 2

After welded pipes of the same size as described above were produced by using various kinds of sample steel having chemical components shown in Table 5, the pipes were respectively circumferentially welded by gas-shield arc welding with use of weld steel wire having chemical components shown in Table 6. The diameter of the wire used was 1.2 mm. By using 80% Ar+20% $CO_2$ (for an initial layer and a final layer) and $CO_2$ (for layers except the initial and final layers) as shield gas, the pipes were welded at a welding current of 200 to 240 A.

Results of measurement of "welding workability", "weld metal strength (yield strength)", "toughness" and "welding crack" and "preferential corrosion speed in a seawater environment" are shown in Table 7. Methods for testing "yield strength", "toughness", "welding crack" and "preferential corrosion speed" were the same as those described above.

As shown in Table 7, it was confirmed that the circumferential weld portion welded with gas-shield arc weld wire has a yield strength of not smaller than 350N/mm$^2$ and a toughness of not smaller than 50 J and is excellent in preferential corrosion characteristic and also excellent in welding workability and crack resistance.

TABLE 5

Chemical Components (% by weight) of Given Base Material

| Chemical Components of Given Steel (% by weight) | | | | | | | | Mechanical Properties | |
|---|---|---|---|---|---|---|---|---|---|
| C | Si | Mn | P | S | Cu | Ni | Mo | Yield Strength (N/mm$^2$) | Absorption Energy (J) |
| 0.05 | 0.29 | 1.50 | 0.006 | 0.006 | 0.22 | 0.25 | tr. | 508 | 350 |

TABLE 6

| Sm. | Chemical Components (% by weight) of Welding Wire | | | | | | | | | | | | | | | |
|---|---|---|---|---|---|---|---|---|---|---|---|---|---|---|---|---|
| | C | Si | Mn | P | S | Cu | Ni | Cr | Mo | Ti | Al | V | Nb | Zr | B | N | O |
| A | 0.06 | 0.51 | 1.55 | 0.012 | 0.010 | 0.45 | 0.75 | 0.03 | 0.03 | 0.004 | 0.005 | 0.004 | 0.008 | 0.01 | 0.0004 | 0.008 | 0.005 |
| B | 0.06 | 0.55 | 1.52 | 0.011 | 0.012 | 0.27 | 0.78 | 0.02 | 0.06 | 0.032 | 0.006 | 0.005 | 0.005 | 0.01 | 0.0003 | 0.005 | 0.007 |
| C | 0.02 | 1.08 | 2.40 | 0.015 | 0.005 | 2.80 | 1.35 | 0.02 | 0.15 | 0.003 | 0.005 | 0.003 | 0.006 | 0.01 | 0.0003 | 0.004 | 0.007 |
| D | 0.13 | 0.30 | 1.05 | 0.011 | 0.015 | 0.02 | 2.50 | 0.02 | 0.05 | 0.004 | 0.007 | 0.004 | 0.004 | 0.01 | 0.0003 | 0.007 | 0.007 |
| E | 0.08 | 0.25 | 0.68 | 0.010 | 0.014 | 0.72 | 1.02 | 0.02 | 0.24 | 0.25 | 0.005 | 0.003 | 0.004 | 0.01 | 0.0002 | 0.006 | 0.006 |
| F | 0.09 | 0.30 | 1.20 | 0.010 | 0.014 | 0.25 | 0.40 | 0.02 | 0.01 | 0.004 | 0.005 | 0.003 | 0.004 | 0.01 | 0.0003 | 0.003 | 0.007 |
| G | 0.18 | 0.40 | 1.25 | 0.011 | 0.012 | 0.12 | 0.11 | 0.02 | 0.21 | 0.002 | 0.004 | 0.003 | 0.005 | 0.01 | 0.0003 | 0.004 | 0.005 |
| H | 0.14 | 0.35 | 1.30 | 0.010 | 0.013 | 3.45 | 0.85 | 0.02 | 0.05 | 0.05 | 0.005 | 0.003 | 0.004 | 0.01 | 0.0004 | 0.002 | 0.005 |
| I | 0.002 | 0.12 | 0.48 | 0.011 | 0.013 | 0.32 | 0.66 | 0.02 | 0.01 | 0.002 | 0.006 | 0.004 | 0.005 | 0.01 | 0.0004 | 0.003 | 0.007 |
| J | 0.06 | 1.45 | 2.84 | 0.011 | 0.013 | 0.29 | 0.65 | 0.02 | 0.01 | 0.002 | 0.006 | 0.004 | 0.005 | 0.01 | 0.0003 | 0.006 | 0.006 |
| K | 0.06 | 0.56 | 1.45 | 0.011 | 0.011 | 0.65 | 3.65 | 0.02 | 0.05 | 0.05 | 0.005 | 0.003 | 0.005 | 0.01 | 0.0003 | 0.007 | 0.006 |
| L | 0.07 | 0.54 | 1.50 | 0.012 | 0.014 | 0.52 | 0.70 | 0.02 | 1.32 | 0.36 | 0.005 | 0.004 | 0.006 | 0.01 | 0.0003 | 0.006 | 0.006 |

TABLE 7

| | Test Results | | | | | | | |
|---|---|---|---|---|---|---|---|---|
| Symbol | Welding Workability | Coagulation Crack | Low Temperature Crack Crack | Yield Strength (N/mm$^2$) | Charpy Absorption Energy (J) | Preferential Corrosion speed (mm/y) | Total Estimation | Note |
| A | ○ | ○ | ○ | 528 | 138 | 0.0 | ○ | Invention |
| B | ○ | ○ | ○ | 545 | 155 | 0.0 | ○ | Invention |
| C | ○ | ○ | ○ | 588 | 135 | 0.0 | ○ | Invention |
| D | ○ | ○ | ○ | 591 | 105 | 0.0 | ○ | Invention |
| E | ○ | ○ | ○ | 485 | 85 | 0.0 | ○ | Invention |
| F | ○ | ○ | ○ | 567 | 104 | 0.35 | X | Comparative |
| G | X | ○ | X | — | — | — | X | Comparative |
| H | ○ | X | ○ | — | — | — | X | Comparative |
| I | X | ○ | ○ | — | — | — | X | Comparative |
| J | X | ○ | X | — | — | — | X | Comparative |
| K | ○ | ○ | X | — | — | — | X | Comparative |
| L | X | ○ | X | — | — | — | X | Comparative |

Notice:
○ good,
X bad.

What is claimed is:

1. A method for gas-shield arc welding of a pipe characterized in that circumferential welding is carried out to a pipe base material having chemical components listed below as (1), using a weld wire having chemical components listed below as (2), under the conditions listed below as (3), to obtain a zone of a weld metal having chemical components listed below as (4), in a circumferential welding of a pipe:

(1) The chemical components of the pipe base material containing, in % by weight:
C; 0.03 to 0.15%
Si; 0.05 to 0.50%
Mn; 0.50 to 2.00%
Al; 0.005 to 0.10%
and further containing, as the residual part, Fe and inevitable impurities;

(2) The chemical components of the weld wire containing, in % by weight:
C; 0.01 to 0.15%
Si; 0.20 to 1.20%
Mn; 0.60 to 2.50%
Cu; $\leq 3.00\%$
Ni; 0.50 to 3.00%
and further containing, as the residual part, Fe and inevitable impurities satisfying the following ranges:
P; $\leq 0.030\%$
N; $\leq 0.01\%$
Cr; $\leq 0.05\%$
B; $\leq 0.002\%$
S; $\leq 0.030\%$
Nb; $\leq 0.02\%$
Zr; $\leq 0.05\%$
Al; $\leq 0.05\%$
V; $\leq 0.02\%$
O; $\leq 0.02\%$ (3) The welding conditions being:
shield gas; 100% $CO_2$ or Ar +(from 5 to 40% of) $CO_2$
weld wire; wire diameter; 0.8 to 1.6 mm
welding current; 100 to 500 A
arc voltage; 15 to 45 V
welding speed; 5 to 150 cm/min.
welding attitude; all positions;

(4) The chemical components of the weld metal containing, in % by weight:
C; 0.01 to 0.15%
Si; 0.20 to 1.00%
Mn; 0.40 to 2.00%
Cu; $\leq 2.50\%$
Ni; 0.50 to 2.50%
$\Delta Cu + \Delta Ni$; $\geq 0.50\%$
($\Delta$; content in weld metal—content in base material)
$P_{CM} \leq 0.25\%$ in which
$P_{CM} = C + Si/30 + Mn/20 + Cu/20 + Ni/60 + Cr/20 + Mo/15 + V/10 + 5B$
and
the residual part is composed of Fe and inevitable impurities satisfying the following ranges:
P; $\leq 0.030\%$
N; $\leq 0.050\%$
Cr; $\leq 1.00\%$
Zr; $\leq 0.05\%$
S; $\leq 0.030\%$
Nb; $\leq 0.10\%$ Ca; $\leq 0.0025\%$
B; $\leq 0.002\%$
Al; $\leq 0.05\%$
V; $\leq 0.10\%$
O; $\leq 0.10\%$ 2. A method for gas-shield arc welding of a pipe according to claim 1, in which said weld metal contains, in addition of the aforementioned chemical components listed as (4), at least one of Mo and Ti in the following proportion (% by weight):
Mo; $\leq 1.05\%$ or $\Delta$Mo; $\geq 0.03\%$ ($\Delta$: content in weld metal—content in base material); and
Ti; $\leq 0.25\%$.

3. A method for gas-shield arc welding of a pipe characterized in that circumferential welding is carried out to a pipe case material having chemical components listed below as (1), using a weld wire having chemical components listed below as (2), under the condition listed below as (3), to obtain zone of a weld metal having chemical components listed below as (4), in circumferential welding of a pipe:

(1) The chemical components of the pipe base material containing, in % by weight:
C; 0.03 to 0.15%
Si; 0.05 to 0.50%
Mn; 0.50 to 2.00%
Al; 0.005 to 0.10%
at least one member selected from the following group:
Cu; 0.05 to 2.0%
Ni; 0.05 to 2.0%
Cr; 0.05 to 2.0%
Mo; 0.05 to 1.0%
Nb; 0.005 to 0.20%
V; 0.005 to 0.20%
Ti; 0.005 to 0.20%
B; 0.0005 to 0.0020%
Ca; 0.0005 to 0.0050%
and further containing, as the residual part, Fe and inevitable impurities;

(2) The chemical components of the weld wire containing, in % by weight:
C; 0.01 to 0.15%
Si; 0.20 to 1.20%
Mn; 0.60 to 2.50%
Cu; $\leq 3.00\%$
Ni; 0.50 to 3.00%
at least one member selected from the following group:
Mo; $\leq 1.10\%$
Ti; $\leq 0.30\%$ and further containing, as the residual part, Fe and inevitable impurities satisfying the following ranges:
P; $\leq 0.030\%$
N; $\leq 0.01\%$
Cr; $\leq 0.05\%$
B; $\leq 0.002\%$
S; $\leq 0.030\%$
Nb; $\leq 0.02\%$
Zr; $\leq 0.05\%$
Al; $\leq 0.05\%$
V; $\leq 0.02\%$
O; $\leq 0.02\%$ (3) The welding conditions being:
Shield gas; 100% $CO_2$ or Ar+(from 5 to 40% of) $CO_2$
wire diameter; 0.8 to 1.6 mm
welding current; 100 to 500 A
arc voltage; 15 to 45 V
welding speed; 5 to 150 cm/min
welding attitude; all positions;

(4) The chemical components of the weld metal containing, in % by weight:
C; 0.01 to 0.15%
Si; 0.20 to 1.00%
Mn; 0.40 to 2.00%
Cu; $\leq 2.50\%$
Ni; 0.50 to 2.50%
$\Delta$Cu+$\Delta$Ni; $\geq 0.50\%$
($\Delta$; content in weld metal—content in base material)
$P_{CM} \leq 0.25\%$ in which
$P_{CM} = C + Si/30 + Mn/20 + Cu/20 + Ni/60 + Cr/20 + Mo/15 + V/10 + 5B$
and
the residual part is composed of Fe and inevitable impurities satisfying the following ranges:
P; $\leq 0.030\%$
N; $\leq 0.050\%$
Cr; $\leq 1.00\%$
S; $\leq 0.030\%$
Nb; $\leq 0.10\%$
Ca; $\leq 0.0025\%$
B; $\leq 0.002\%$
Al; $\leq 0.05\%$
V; $\leq 0.10\%$
O; $\leq 0.10\%$.

4. A method for gas-shield arc welding of a pipe according to claim 3, in which said weld metal contains, in addition of the aforementioned chemical components listed as (4), at least one of Mo and Ti in the following proportion:
Mo; $\leq 1.05\%$ or $\Delta$Mo; $\geq 0.03\%$ ($\Delta$: content in weld metal—content in base material); Ti$\leq 0.25\%$.

* * * * *

UNITED STATES PATENT AND TRADEMARK OFFICE
CERTIFICATE OF CORRECTION

PATENT NO. : 5,300,751
DATED : APRIL 5, 1994
INVENTOR(S) : ENDO et al.

It is certified that error appears in the above-indentified patent and that said Letters Patent is hereby corrected as shown below:

Column 16, line 46,
Claim 3, after last line, insert --$Zr \leq 0.05\%$--.

Signed and Sealed this

Fifth Day of March, 1996

Attest:

BRUCE LEHMAN

*Attesting Officer*        *Commissioner of Patents and Trademarks*